June 25, 1957 H. KLEIN 2,796,955
SHOCK ABSORBER RESERVOIR SEAL
Filed March 30, 1954
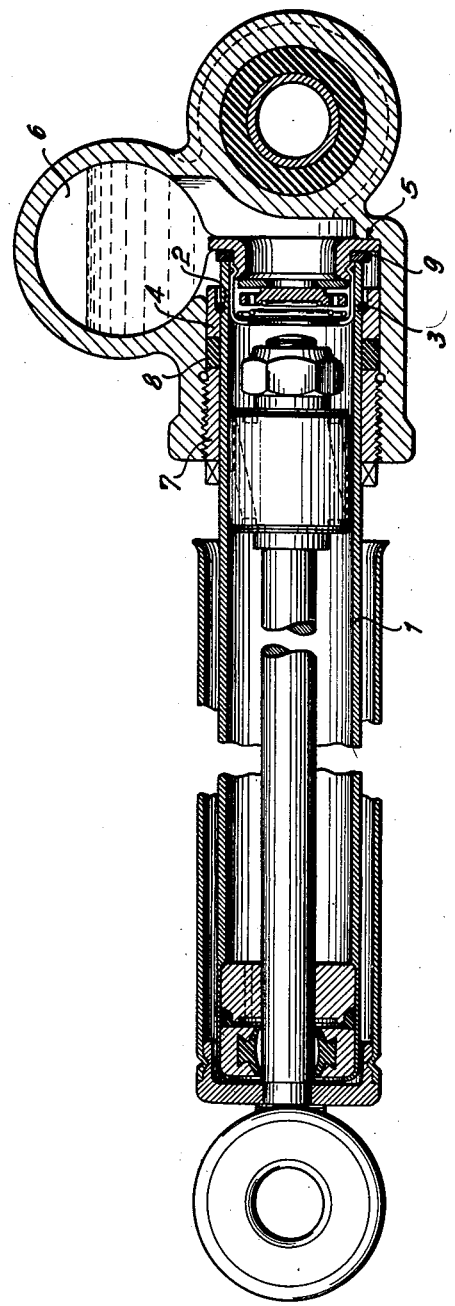
INVENTOR
HERMANN KLEIN
BY

United States Patent Office 2,796,955
Patented June 25, 1957

2,796,955

SHOCK ABSORBER RESERVOIR SEAL

Hermann Klein, Schweinfurt am Main, Germany, assignor to Firma Fichtel & Sachs A.-G., Schweinfurt am Main, Germany Application March 30, 1954, Serial No. 419,787

Claims priority, application Germany March 30, 1953

2 Claims. (Cl. 188—100)

The present invention relates to shock absorbers.

More particularly, the present invention relates to a structure for connecting the cylinder of a shock absorber to the container of the shock absorber which holds the fluid medium of the shock absorber.

With conventional shock absorbers, the cylinder is provided with an outer thread engaging an inner thread of the container for the fluid medium, but this arrangement carries with it the difficulty of preventing the fluid medium from escaping through the threaded connection between the cylinder and container.

It is an object of the present invention to overcome the above difficulty by providing a means for interconnecting the cylinder and container of a shock absorber in such a way that no threads are required at the outer surface of the cylinder, so that the possibility of leakage along such threads is eliminated.

A further object of the present invention is to provide a structure capable of accomplishing the above objects and at the same time providing an easy and quick assembly or disassembly of the cylinder and container.

With the objects in view, the present invention mainly consists of a shock absorber which includes a container having a cylindrical opening and adapted to contain a fluid medium, and a cylinder extending with clearance through the cylindrical opening into the container and having within the container a smooth outer surface portion. A means engages the smooth outer surface portion of the cylinder as well as the container for holding the cylinder and container together and for preventing leakage of the fluid medium out of the container through the opening thereof.

More specifically, a cylindrical member having a cylindrical end portion of a diameter smaller than the diameter of the cylindrical opening of the container is arranged within this cylindrical opening, the cylindrical member having an abutment means which prevents movement of the cylindrical member into the container beyond a predetermined position. An annular pressure member is arranged in the space between the outer face of the cylindrical member and the inner face of the cylindrical opening. An engaging means is located on at least one of the cylindrical and annular pressure members to limit the movement of the annular pressure member relative to the cylindrical member into the container. A movable annular moving means is mounted between the container and the annular pressure member for moving the latter into the container, whereby movement of the moving means relative to the container will cause movement of the annular pressure member into the container which in turn will cause movement of the cylindrical end portion of the cylinder into the container until the abutment means engages the container to hold the cylinder in the above-mentioned predetermined position thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, which is a partly fragmentary sectional view of a shock absorber constructed in accordance with the present invention, the plane along which the section of the drawing is taken including the central axis of the cylinder illustrated therein.

Referring now to the drawing, it will be seen that the structure of the invention includes a cylinder 1 in which the piston of the shock absorber is adapted to reciprocate, as is well known. This cylinder 1 has its right hand end portion, as viewed in the drawing, located within the cylindrical open end portion of the container 6, which is adapted to contain the fluid medium of the shock absorber, such as oil, or the like.

The end portion of the cylinder 1 which extends into the container 6 is formed with an annular groove 2 and is entirely smooth at its outer surface except for the annular groove. A snap ring 3 is located within the groove 2 and extends beyond the outer surface of the cylinder 1, as is evident from the drawing. An annular member in the form of a pressure ring 4 slidably engages the outer surface of the cylinder as well as the inner surface of the cylindrical opening of container 6, and this annular pressure ring 4 is formed at its right hand end, as viewed in the drawing, with an inner surface portion of enlarged diameter. The ring 3 is accommodated with pressure in the enlarged interior of the pressure ring 4. An elastic annular member in the form of a ring 8 also engages the outer surface of the cylinder 1 and the inner surface of the cylindrical opening of the container 6, and this elastic ring 8 is located next to and in abutment with the pressure ring 4. Elements 4 and 8 together form an annular pressure means.

A bracket is mounted against the inner surface 5 of the container 6 and houses, in a known way, a spring and valve which participate, in a known way not forming part of the present invention, in the operation of the shock absorber. About this bracket there is located a sealing ring 9 against which the right end of the cylinder 1 abuts, as viewed in the drawing.

The inner surface of the cylindrical opening of the container 6 is threaded and threadedly receives the outer threaded surface of a moving means in the form of a sleeve 7 which slidably engages the smooth outer surface of the cylinder 1.

Thus, it is evident that the structure of the invention interconnects the cylinder 1 and container 6 without threads on the outer surface of cylinder 1 so that there is no possibility of leakage of the fluid medium along such threads. In assembling the parts, the cylinder 1 is located within the cylindrical opening of the container 6, and the rings 4 and 8 are placed about the cylinder 1 between the latter and the container. Then the sleeve 7 is placed about the cylinder and threaded onto the container, this sleeve 7 having at its left end, as viewed in the drawing, notches or the like to enable the sleeve 7 to be turned with a wrench. The sleeve 7 is turned with respect to container 6 until the parts assume the position shown in the drawing, beyond which they cannot move any further to the right, as viewed in the drawing.

It will be understood that each of the elements described above, or two or more together, may also find a useful application in other types of shock absorbers differing from the types described above.

While the invention has been illustrated and described as embodied in means for interconnecting the cylinder and fluid container of a shock absorber, it is not intended to be limited to the details shown, since various modifications and structural changes may be made without departing in any way from the spirit of the present invention.

Without further analysis, the foreging will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a shock absorber, in combination, a container for a fluid medium, said container having an open end portion formed at its inner face with threads; a cylinder having an open end portion located in said open end portion of said container and formed at its outer surface with an annular groove located in said container, said outer surface of said end portion of said cylinder in said container being entirely smooth except for said groove; a ring located in said annular groove and extending outwardly beyond the outer surface of said cylinder; annular pressure means in said end portion of said container slidably engaging said outer surface of said cylinder and having an inner surface portion engaging said ring to maintain the latter in said groove, said annular pressure means comprising a first annular member having said inner surface portion and a second, elastic annular member abutting against the end of said first annular member nearest to the extremity of said open end portion of said container; and an outwardly threaded sleeve threadedly engaging said threads of said open end portion of said container and abutting against said second annular member of said annular pressure means.

2. In a shock absorber, in combination, a container for a fluid medium, said container having an open end portion formed at its inner face with threads; a cylinder having an open end portion located in said open end portion of said container and formed at its outer surface with an annular groove located in said container, said outer surface of said end portion of said cylinder in said container being entirely smooth except for said groove; a ring located in said annular groove and extending outwardly beyond the outer surface of said cylinder; annular pressure means in said end portion of said container slidably engaging said outer surface of said cylinder and having an inner surface portion engaging said ring to maintain the latter in said groove, said annular pressure means comprising a first annular member having said inner surface portion and a second, elastic annular member abutting against the end of said first annular member nearest to the extremity of said open end portion of said container; an outwardly threaded sleeve threadedly engaging said threads of said open end portion of said container and abutting against said second annular member of said annular pressure means: and annular sealing means located in said container and engaging the end of said cylinder located in said container.

References Cited in the file of this patent

UNITED STATES PATENTS

| 1,853,411 | Gentry et al. | Apr. 12, 1932 |
| 1,869,915 | Sample | Aug. 2, 1932 |
| 2,017,717 | Heeter | Oct. 15, 1935 |
| 2,095,112 | Wallace | Oct. 5, 1937 |
| 2,318,575 | Armington et al. | May 11, 1943 |
| 2,367,220 | Knox | Jan. 16, 1945 |

FOREIGN PATENTS

| 453,217 | Great Britain | Mar. 19, 1936 |